United States Patent [19]

Burke

[11] Patent Number: 5,225,757
[45] Date of Patent: Jul. 6, 1993

[54] METHODS FOR DERIVING AND IMPLEMENTING MOTION PROFILES FOR DRIVE SYSTEMS

[75] Inventor: Edward F. Burke, Lake Oswego, Oreg.

[73] Assignee: Tektronix, Inc., Wilsonville, Oreg.

[21] Appl. No.: 716,456

[22] Filed: Jun. 17, 1991

[51] Int. Cl.$^5$ .............................. H02P 8/00
[52] U.S. Cl. ..................................... 318/696
[58] Field of Search ......................... 318/696

[56] References Cited

U.S. PATENT DOCUMENTS 4,648,026  3/1987  Petrick ..................... 364/130

OTHER PUBLICATIONS

*Linear Systems, A State Variable Approach With Numerical Implementation*, Raymond A. DeCarlo, Prentice Hall, 1989, pp. 311–327.

*Primary Examiner*—William M. Shoop, Jr.
*Assistant Examiner*—Karen Masih
*Attorney, Agent, or Firm*—John D. Winkelman; Ann W. Speckman

[57] ABSTRACT

The present invention provides a stable, high performance system for driving one or more masses in precise incremental movements. More particularly, the present invention provides a method and system for deriving and implementing motion profiles that govern the movement of one or more masses, such as a printer drum as it is indexed along a rotational path by a stepper motor.

18 Claims, 14 Drawing Sheets

METHODS FOR DERIVING AND IMPLEMENTING MOTION PROFILES FOR DRIVE SYSTEMS

FIELD OF THE INVENTION

This invention relates to methods and apparatus for controllably driving the motion of one or more masses, and relates more particularly to methods for deriving and implementing motion profiles, e.g., position and velocity profiles, approximately ideal motion profiles for one or more masses driven, for example, by a stepper motor. The methods and apparatus of the present invention are especially suitable for use in thermal phase change ink jet printers.

BACKGROUND OF THE INVENTION

Drive means such as stepper motors are conventionally employed in equipment such as X-Y plotters, printing apparatus, and the like. Such apparatus require generally incremental displacements of one or more masses. The mass (or masses) being driven in such applications are accelerated from zero velocity to a selected velocity, and then decelerated to zero velocity to complete a cycle. The masses are typically required to complete such cycles of movement in rapid succession.

Print substrates are supported by a substrate support during many types of printing operations. The substrate support may take the form of a generally planar or curved rigid surface, or a hollow, cylindrical print drum. The print substrate and a printing mechanism are typically moved relative to one another as printing material is applied to the print substrate. The print substrate may be indexed at predetermined intervals to expose different areas of the print substrate for printing.

Imprecise indexing of the print substrate may result in overshoot, ringing and noise. Overshoot occurs when the print substrate and substrate support are moved beyond the desired final position and must then be returned to the desired final position. Vibrational ringing occurs when the substrate support does not stop positively. These problems are exacerbated by frictional forces, which cause the masses to stop in unpredictable locations.

Overshoot and ringing generally result in diminished print quality, particularly in thermal phase change ink jet printers in which precise ink drop placement is critical. Throughput rates are also affected, because printing operations cannot commence until overshoot has been corrected and ringing has subsided. Additionally, imprecise indexing may result in serious acoustic noise which is objectionable from an operational standpoint.

In printer applications, the desired substrate support (e.g., print drum) motion profile is normally conveyed directly to a stepper motor, and the stepper motor generates rotational output corresponding to the desired position profile. A print drum is typically driven by a cable and pulley system or a cogged timing belt which translates the rotational motor drive output to substrate support indexing.

In general, acceleration/deceleration motion profiles may be either linear or nonlinear. An exemplary linear profile is illustrated in FIG. 1a. Linear velocity profiles are generally characterized by constant acceleration from zero or another predetermined velocity, followed by a zero acceleration constant velocity period, followed by constant deceleration to the initial velocity level. Linear profiles generally result in ringing at the inflection points of the motion profile, as shown.

Nonlinear acceleration/deceleration profiles are illustrated in FIGS. 1b and 1c. Non-linear velocity profiles of the type shown in FIG. 1b are optimized for a maximum velocity, shown as $V_{MAX}$. Velocity profiles for velocities (V) lower than the maximum are simply truncated versions of the maximum velocity profile. The truncated velocity profiles may produce ringing at inflection points, as shown.

Alternatively, a plurality of nonlinear velocity profiles similar to the velocity profile for $V_{MAX}$ illustrated in FIG. 1b may be derived for several selected velocities and stored. This system requires substantial memory capability, however, and it may not be suitable for applications requiring a large number of programmed velocity profiles.

U.S. Pat. No. 4,648,026 teaches a microprocessor stepper motor drive which utilizes a single acceleration/deceleration motion profile regardless of the final velocity and/or position of the device being driven. The acceleration/deceleration motion profile is stored in a storage device and added to the desired final velocity to produce smooth velocity profiles corresponding to selected desired velocities, as shown in FIG. 1c.

Although the non-linear velocity profiles of the types shown in FIG. 1c are satisfactory for some systems, overshoot, ringing and acoustic noise remain problematic for high precision, rapidly cycling systems such as rotational indexing of a print drum and associated print substrate during operation of ink jet printers. Such applications require quiet, rapid and accurate movement to provide high quality printed products. The methods and apparatus of the present invention are thus directed to the derivation and implementation of motion profiles that provide quiet, rapid and precise rotational indexing of one or more masses driven, for example, by a stepper motor.

SUMMARY OF THE INVENTION

The present invention provides a stable, high performance system for driving one or more masses in precise incremental movements. More particularly, the present invention provides a method and system for deriving and implementing motion profiles that govern the movement of one or more masses, such as a printer drum as it is indexed along a rotational path by a stepper motor.

A mathematical approach using state variable dynamics and Kalman controllability is used to generate a continuous ideal motion profile for a particular set of printing parameters over time. The Kalman controllability formulation provides an input function that can be implemented to provide the ideal motion profiles. These ideal motion profiles describe movement of an initially stationary system having one or more masses driven by a common drive to a new position, so that all of the masses arrive at the new location with zero velocity. Moreover, the final positions of the masses are consistent with the timing belt ratios, and no residual strain energy is stored in the belts after the desired movement stops.

Simulated and actual system performance demonstrated that a multiple mass system operated using motion profiles approximating the ideal motion profiles moves quietly and stops accurately, even during rapid operation. Implementation of the methods and apparatus of the present invention has additionally improved the robustness of the stepper motor and reduced operational problems resulting from the motor stalling or losing steps. Consequently, printers employing a motion profile derived in accordance with the present invention exhibit enhanced print quality and decreased print time, and, moreover, generate significantly less acoustic noise.

BRIEF DESCRIPTION OF THE DRAWINGS

The above-mentioned and additional features of the present invention and the manner of obtaining them will become apparent, and the invention will be best understood by reference to the following more detailed description, read in conjunction with the accompanying drawings, in which.

DETAILED DESCRIPTION OF PREFERRED EMBODIMENTS

The methods and systems of the present invention are described herein with reference to the rotational indexing of a print drum connected, by means of a timing belt and idler pulley, to a stepper motor. Although the methods of the present invention are well suited to this type of drive system, they are not limited to this application. Methods of the present invention may be utilized to generate and implement motion profiles for any system wherein one or more masses are driven by a common drive means.

Figure 1A:
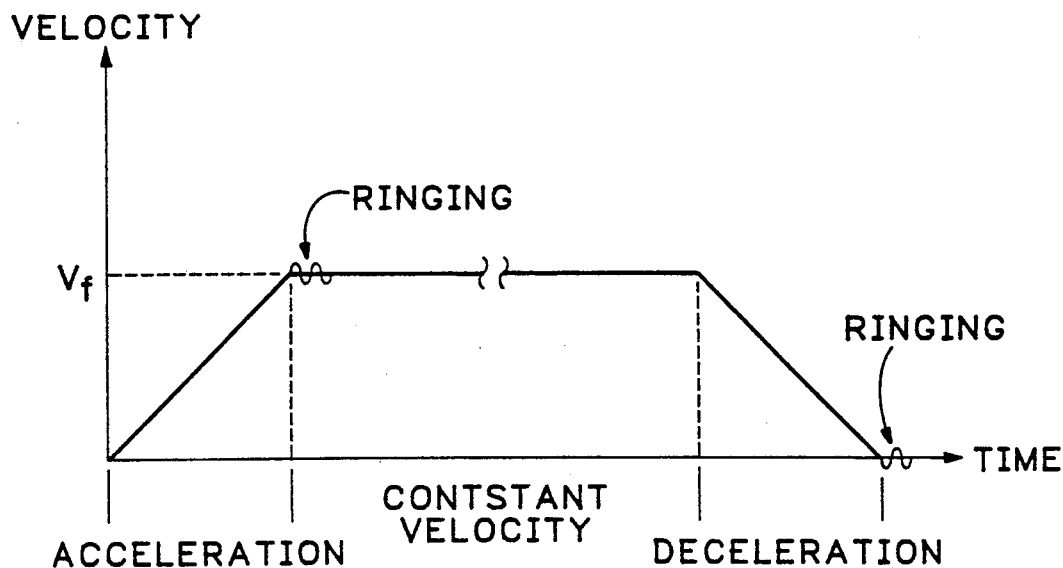
FIG. 1(a) shows a graphical representation of a prior art linear acceleration/deceleration profile.
Figure 1B:
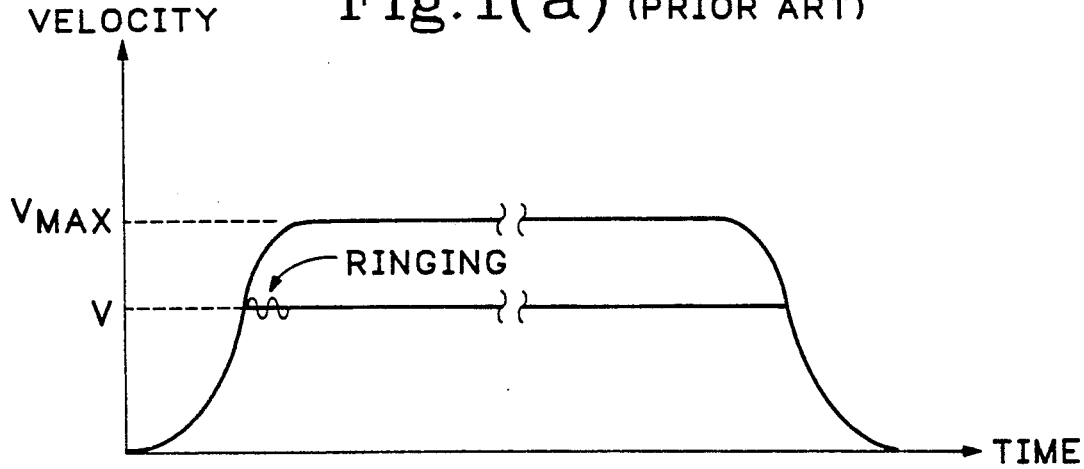
FIG. 1(b) shows a graphical representation of prior art nonlinear acceleration/deceleration profiles optimized for $V_{MAX}$.
Figure 1C:
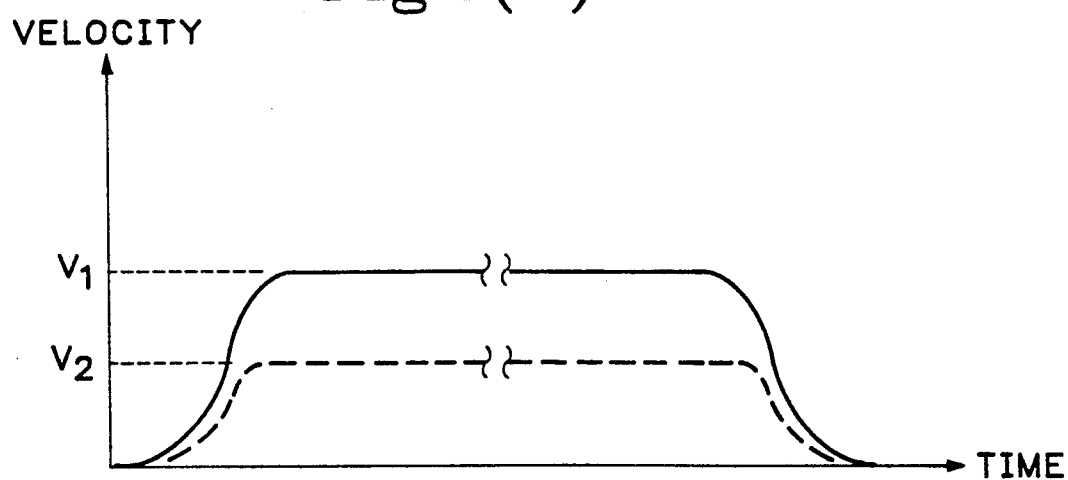
FIG. 1(c) shows a graphical representation of prior art acceleration/deceleration profiles having generally the same characteristics for two selected velocities.
Figure 2:
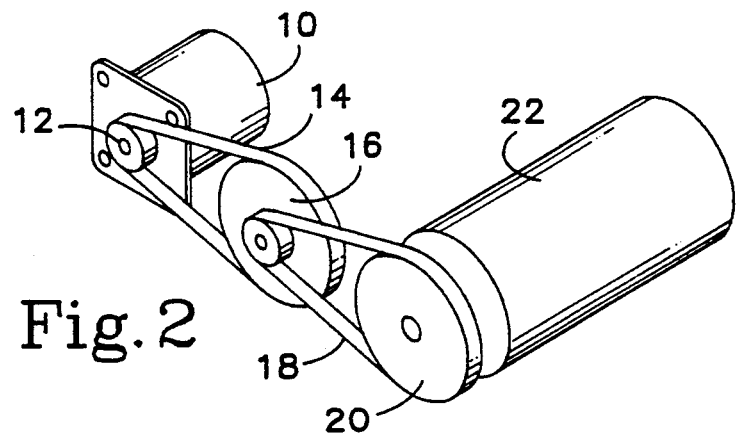
FIG. 2 shows a schematic representation of a drive system for rotationally indexing a mass such as a printer drum.

A conventional motor drive system for rotating a print drum during printing operations is illustrated in FIG. 2. Motor drive 10 is preferably a two phase stepper motor. A two phase stepper motor may be controllably rotated by applying a sequence of current magnitudes to each motor phase. A typical stepper motor generates about two hundred whole steps per revolution. Whole stepping is therefore a relatively crude method of driving a motor when precise motor movements are required.

Figure 3A:
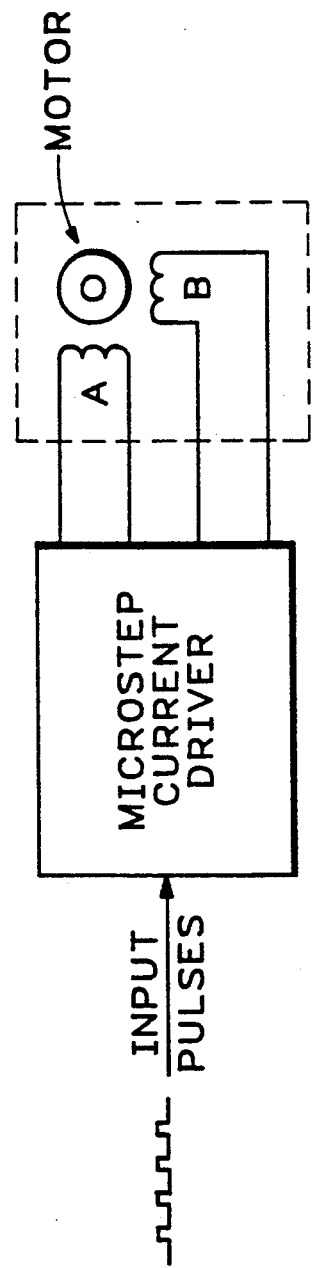
FIG. 3(a) is a schematic diagram illustrating the technique of microstepping.
Figure 3B:
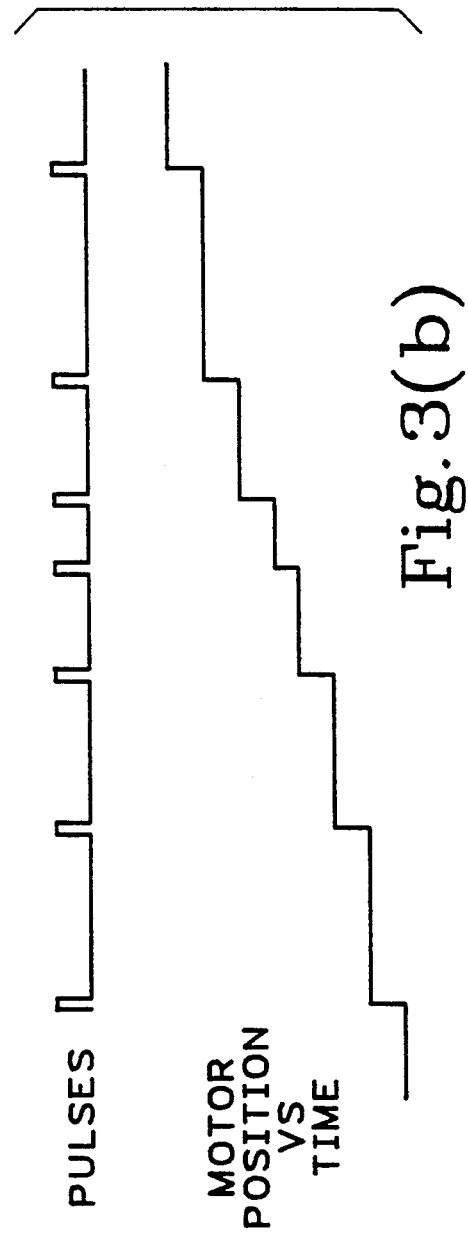
FIG. 3(b) shows, schematically, the correspondence between microstep input pulses and motor drive microsteps.

The technique known as microstepping facilitates more precise motor control by providing hundreds or thousands of positions per revolution. More specifically, input pulses are communicated to a microstep current driver which directs the advance of the phase currents of both phases of the motor by one microstep, as illustrated schematically in FIG. 3(a). For purposes of the present invention, a microstep current driver generating eight hundred (800) microsteps per revolution was utilized. The phase current advance therefore resulted in one eight-hundredth of a revolution per input pulse. The timing of these input pulses determines the motion profile of the system, as schematically illustrated in FIG. 3(b).

The system of the present invention preferably employs an open loop control system and does not require more complex, closed loop control features. Motor 10 is preferably controlled by a microprocessor (not shown) that can be programmed to start and stop the motor, as well as to implement desired motion profiles. The microprocessor controls the precise timing between microstep pulses. More specifically, a position v. time history can be generated by summing the microstep pulses, as shown schematically in FIG. 3(b).

The three individual masses in the system illustrated in FIG. 2 are connected by means of flexible members, such as timing belts. Motor rotor 12 is connected via timing belt 14 to idler pulley 16, and idler pulley 16 is connected, via timing belt 18, to drive pulley 20 rigidly mounted on print drum 22. The gear ratio of the timing belt drive is adjusted so that one whole step at the stepper motor rotor corresponds to one pixel at the drum surface.

Figure 4:
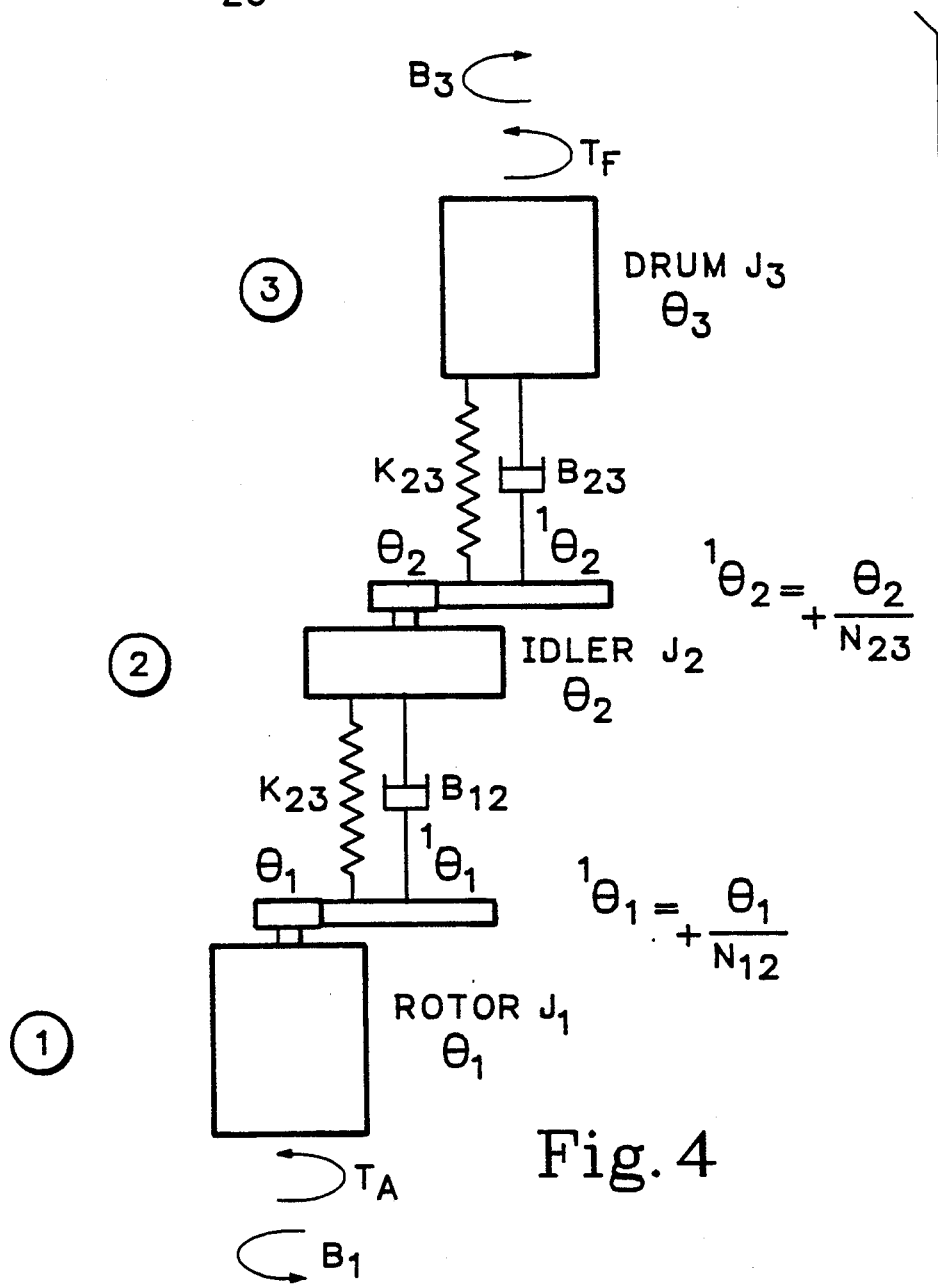
FIG. 4 illustrates a mathematical model of the drive system dynamics for a system with three masses as shown in FIG. 2.

For the purposes of the present invention, the timing belts may be modelled as elastic springs arranged in parallel to damping elements, such as dashpots, as shown in FIG. 4. Use of such a model captures the elastic properties as well as the energy dissipation properties of the timing belt. The position of each of the masses after the entire zero velocity position to zero velocity position movement must be consistent with that of the other masses and with the gear ratio of the timing belts, so that no energy is stored in the belts as a result of rotational indexing. If this position/gear ratio consistency is lacking, the belt will be stretched and will store strain energy. Release of the stored strain energy will disrupt the final zero velocity condition of the three mass system.

FIG. 4 illustrates a mathematical model of the drive system dynamics for an exemplary system in which three masses—the motor rotor, the idler pulley and the print drum—are moved from one position to another. $T_A$ is the torque applied to the first mass, the rotor, by the motor. The first mass has a mass moment of inertia $J_1$ and the rotary position of the rotor is represented by $\theta_1$ in the time domain. The second mass, the idler pulley, has a mass moment of inertia $J_2$, torque $T_2$, and its rotary position is represented by $\theta_2$ in the time domain. The third mass, the drum, has a mass moment of inertia $J_3$, a frictional torque $T_F$, and its rotary position is represented by $\theta_3$ in the time domain. $B_{12}$ and $B_{23}$ represent internal damping in the flexible belts between the rotor and idler pulley and the idler pulley and print drum, respectively. $B_1$, $B_2$ and $B_3$ represent viscous damping to ground of each mass, respectively. $N_{12}$ and $N_{23}$ represent frictionless gear ratios for each timing belt, and $K_{12}$ and $K_{23}$ represent the elastic coefficients for each timing belt.

Equations of motion were written for each of the masses in the system based upon the following assumptions: (1) the system is frictionless, except for viscous damping represented by $B_{12}$ and $B_{23}$, viscous damping represented by $B_1$, $B_2$ and $B_3$, and coulomb frictional torque $T_F$; (2) belts can be modelled by an elastic coefficient K and viscous damping parameter B combined with a frictionless gear ratio N; and (3) motor command angle $\phi$ is changed instantaneously. The equations for rotary motion of the motor rotor, the idler pulley, and the print drum are as follows:

$$J_1\ddot{\theta}_1 = \frac{-K_{12}('\theta_1 - \theta_2)}{N_{12}} - \frac{B_{12}('\dot{\theta}_1 - \dot{\theta}_2)}{N_{12}} + T_A - B_1\dot{\theta}_1$$

$$J_2\ddot{\theta}_2 = K_{12}('\theta_1 - \theta_2) + B_{12}('\dot{\theta}_1 - \dot{\theta}_2) -$$

$$\frac{K_{23}('\theta_2 - \theta_3)}{N_{23}} - \frac{B_{23}('\dot{\theta}_2 - \dot{\theta}_3)}{N_{23}} - B_2\dot{\theta}_2$$

$$J_3\ddot{\theta}_3 = K_{23}('\theta_2 - \theta_3) + B_{23}('\dot{\theta}_2 - \dot{\theta}_3) - T_F - B_3\dot{\theta}_3$$

where $\theta$ represents position, $\dot{\theta}$ represents velocity; and $\ddot{\theta}$ represents acceleration, all in the time domain.

The above equations can be rewritten to eliminate $'\theta_1$ and $'\theta_2$ (mass position adjusted for timer belt gear ratio) using the equalities $$'\theta_1 = \frac{\theta_1}{N_{12}} \text{ and } '\theta_2 = \frac{\theta_2}{N_{23}}$$

as follows:

$$J_1\ddot{\theta}_1 = \frac{-K_{12}}{N_{12}}\left(\frac{\theta_1}{N_{12}} - \theta_2\right) -$$

$$\frac{B_{12}}{N_{12}}\left(\frac{\dot{\theta}_1}{N_{12}} - \dot{\theta}_2\right) + T_A - B_1\dot{\theta}_1$$

$$J_2\ddot{\theta}_2 = K_{12}\left(\frac{\theta_1}{N_{12}} - \theta_2\right) + B_{12}\left(\frac{\dot{\theta}_1}{N_{12}} - \dot{\theta}_2\right) -$$

-continued $$\frac{K_{23}}{N_{23}}\left(\frac{\theta_2}{N_{23}} - \theta_3\right) - \frac{B_{23}}{N_{23}}\left(\frac{\dot{\theta}_2}{N_{23}} - \dot{\theta}_3\right)$$

$$J_3\ddot{\theta}_3 = K_{23}\left(\frac{\theta_2}{N_{23}} - \theta_3\right) + B_{23}\left(\frac{\dot{\theta}_2}{N_{23}} - \dot{\theta}_3\right) - T_F - B_3\dot{\theta}_3$$

Viscous damping for the second mass, the idler pulley in the system illustrated in FIG. 2, was negligible and was therefore dropped from the system motion equations.

In order to generate an optimum motion profile for a system of the type illustrated in FIG. 2, the following conditions are preferably satisfied by the three mass system: (1) All three masses must have zero velocity at the initial and final time points; (2) The motor motion profile (position v. time) is monotonic; (3) The final positions of the three masses are consistent with their gear ratios to prevent storage and release of strain energy. The second condition is not a prerequisite for all motion systems, but it may be critical for particular applications.

Using the mathematics of state variable dynamics, a linear system of differential equations may be represented as a dynamic, linked system by a set of first order differential matrix equations. For the equations of motion of a multi-mass system, the dynamic equation is as follows:

$$\dot{x}(t) = A \cdot x(t) + B \cdot u(t)$$

In this equation, $x(t)$ is the generalized state vector for the system where suitable choices of states are the positions and velocities of each of the masses. Thus, the following six states are required to describe a system involving movement of three masses at any time:

$x_1 = \theta_1$
$x_2 = \dot{\theta}_1$
$x_3 = \theta_2$
$x_4 = \dot{\theta}_2$
$x_5 = \theta_3$
$x_6 = \dot{\theta}_3$ Also, $u(t)$ is the input to the system which corresponds to the input profile to the microstep driver.

The derivative of the state at any given time, designated $\dot{x}(t)$, is therefore a function of the system matrix A, the state vector $x(t)$, an input matrix B and an input scalar $u(t)$. Such a dynamic equation is useful if the system behaves linearly or may be approximated as such. The linearity restriction of the state variable approach also requires that $T_F$ at the drum be approximated by $B_3$, a viscous damping coefficient.

The following mathematical equation, based upon the Kalman controllability formulation, expresses the continuous input function $u(t)$ required to transfer a system from an initial state $x_0 = x(t_0)$ to a desired state $x_1 = x(t_1)$ as follows:

$$u(t) = -B^t\phi^t(t_1-t)\dot{k}^{-1}[\phi(t_1-t_0)x_0-x_1]$$

where $\dot{k}$ is a matrix expressed as follows:

$$\dot{k} = \int_{t_0}^{t_1} \Phi(t_1 - q)BB^t\Phi^t(t_1 - q)dq.$$

and $\phi(t)=e^{At}$ is the matrix exponential of A. The variables in the above equation are as follows:
  $x_0$ = initial condition vector
  $x_1$ = final condition vector
  A = the system matrix, a 6×6 matrix in the exemplary, three mass embodiment
  B = the input matrix
  $t_0$ = initial time point prior to transfer
  $t_1$ = final time point after transfer
  t = time
  q is a dummy variable representing time for integration purposes
  superscript$^t$ is the matrix transpose (e.g., $B^t$) superscript$^{-1}$ indicates the inverse of a matrix (e.g., $k^{-1}$)

A, the system matrix, uses the motion equations of the three system masses and is derived and defined as follows:

$$x_1 = \theta_1;\ x_2 = \dot{\theta}_1;\ x_3 = \theta_2;\ x_4 = \dot{\theta}_2;\ x_5 = \theta_3;\ x_6 = \dot{\theta}_3$$

Therefore, $$\dot{X}_1 = X_2;\quad \dot{X}_3 = X_4;\quad \dot{X}_5 = X_6$$

$$\dot{X}_2 = \frac{-K_{12}X_1}{J_1 N_{12}^2} + \frac{K_{12}X_3}{J_1 N_{12}} - \frac{B_{12}X_2}{J_1 N_{12}^2} + \frac{B_{12}X_4}{J_1 N_{12}} + \frac{T_A}{J_1} - \frac{B_1 X_2}{J_1}$$

$$\dot{X}_4 = \frac{K_{12}X_1}{J_2 N_{12}} - \frac{K_{12}X_3}{J_2} + \frac{B_{12}X_2}{J_2 N_{12}} - \frac{B_{12}X_4}{J_2} - \frac{K_{23}X_3}{J_2 N_{23}^2} + \frac{K_{23}X_5}{J_2 N_{23}} - \frac{B_{23}X_4}{J_2 N_{23}^2} + \frac{B_{23}X_6}{J_2 N_{23}}$$

$$\dot{X}_6 = \frac{K_{23}X_3}{J_3 N_{23}} - \frac{K_{23}X_5}{J_3} + \frac{B_{23}X_4}{J_3 N_{23}} - \frac{B_{23}X_6}{J_3} - \frac{B_3 X_6}{J_3}$$

The A matrix can then be expressed as follows:

$$\begin{bmatrix} 0 & 1 & 0 & 0 & 0 & 0 \\ \frac{-K_{12}}{J_1 N_{12}^2} & \left(\frac{-B_{12}}{J_1 N_{12}^2} - \frac{B_1}{J_1}\right) & \frac{K_{12}}{J_2 N_{12}} & \frac{B_{12}}{J_1 N_{12}} & 0 & 0 \\ 0 & 0 & 0 & 1 & 0 & 0 \\ \frac{K_{12}}{J_2 N_{12}} & \frac{B_{12}}{J_2 N_{12}} & \left(\frac{-K_{12}}{J_2} - \frac{K_{23}}{J_2 N_{23}^2}\right) & \left(\frac{-B_{12}}{J_2} - \frac{B_{23}}{J_2 N_{23}^2}\right) & \frac{K_{23}}{J_2 N_{23}} & \frac{B_{23}}{J_2 N_{23}} \\ 0 & 0 & 0 & 0 & 0 & 1 \\ 0 & 0 & \frac{K_{23}}{J_3 N_{23}} & \frac{B_{23}}{J_3 N_{23}} & \frac{-K_{23}}{J_3} & \left(\frac{-B_{23}}{J_3} - \frac{B_3}{J_3}\right) \end{bmatrix}$$

The dynamic equation then becomes:

$$\begin{bmatrix} \dot{X}_1 \\ \dot{X}_2 \\ \dot{X}_3 \\ \dot{X}_4 \\ \dot{X}_5 \\ \dot{X}_6 \end{bmatrix} = \begin{bmatrix} 0 & 1 & 0 & 0 & 0 & 0 \\ \frac{-K_{12}}{J_1 N_{12}^2} & \frac{-B_{12}}{J_1 N_{12}^2} - \frac{B_1}{J_1} & \frac{K_{12}}{J_2 N_{12}} & \frac{B_{12}}{J_1 N_{12}} & 0 & 0 \\ 0 & 0 & 0 & 1 & 0 & 0 \\ \frac{K_{12}}{J_2 N_{12}} & \frac{B_{12}}{J_2 N_{12}} & \frac{-K_{12}}{J_2} - \frac{K_{23}}{J_2 N_{23}^2} & \frac{-B_{12}}{J_2} - \frac{B_{23}}{J_2 N_{23}^2} & \frac{K_{23}}{J_2 N_{23}} & \frac{B_{23}}{J_2 N_{23}} \\ 0 & 0 & 0 & 0 & 0 & 1 \\ 0 & 0 & \frac{K_{23}}{J_3 N_{23}} & \frac{B_{23}}{J_3 N_{23}} & \frac{-K_{23}}{J_3} & \frac{-B_{23}}{J_3} - \frac{B_3}{J_3} \end{bmatrix} \cdot X(t) + \begin{bmatrix} 0 \\ 1 \\ 0 \\ 0 \\ 0 \\ 0 \end{bmatrix} \cdot \frac{T_A(t)}{J_1}$$

B, the input matrix, is expressed above. The non-zero value in the B matrix indicates that the input acts on the motor mass of the three mass system.

An expression was then developed for the applied torque, $T_A$. In general, for a locked rotor of a stepper motor, $T = T_H \sin 50\phi$, where $T_H$ is the peak holding torque for the prevailing current in the motor, and $\phi$ is the motor command angle. In the system illustrated in FIG. 4, both the command angle $\phi$ and the rotor position $\theta_1$ are variable. The applied torque, $T_A$, is therefore expressed as follows: $T_A = T_H \sin 50(\phi - \theta_1)$. As such, $T_A$ introduces non-linearity into the system. If the value of $\phi - \theta_1$ is small enough, however, $\sin 50(\phi - \theta_1)$ is approximately equal to $50(\phi - \theta_1)$. For example, if $\phi - \theta_1$ is 0.003 radians, $\sin 50(\phi - \theta_1)$ is 0.149, and $50(\phi - \theta_1)$ is 0.150. For small or negligible differences $\phi - \theta$, the system behaves in a manner approximating a linear system.

The continuous input function, u(t), was determined for a system of the type shown in FIG. 3. Values for system constants were as follows:

$J_1 = 1.425 \times 10^{-4}$ lb-in-sec$^2$;
$J_2 = 1.441 \times 10^{-3}$ lb-in-sec$^2$;
$J_3 = 5.042 \times 10^{-2}$ lb-in-sec$^2$;
$N_{12} = 5.333$;
$N_{23} = 5.626$;

$K_{12} = 2.676 \times 10^4 \frac{\text{lb-in}}{\text{rad}}$ ;

$K_{23} = 2.676 \times 10^4 \frac{\text{lb-in}}{\text{rad}}$ ;

$B_{12} = 1.469 \frac{\text{lb-in-sec}}{\text{rad}}$ ;

$B_{23} = 1.469 \frac{\text{lb-in-sec}}{\text{rad}}$ $T_H = 3.397$ lb-in;

$B_1 = 6.687 \times 10^{-3} \frac{\text{lb-in-sec}}{\text{rad}}$ ; and $$B_3 = 1.0 \frac{\text{lb-in-sec}}{\text{rad}};$$

The total motion time interval was set at 0.35 sec. The A and B matrices were as set forth above. The beginning and end position points were defined as follows:

$$x_0 = [1\ 0\ 0\ 0\ 0\ 0\ 0]$$

$$x_1 = [0.503\ 0\ 0.0942\ 0\ 0.0168\ 0]$$

The $x_{11}$, $x_{13}$, and $x_{15}$ values are consistent with the values for the frictionless gear ratios $N_{12}$ and $N_{23}$, as required.

Figure 5:
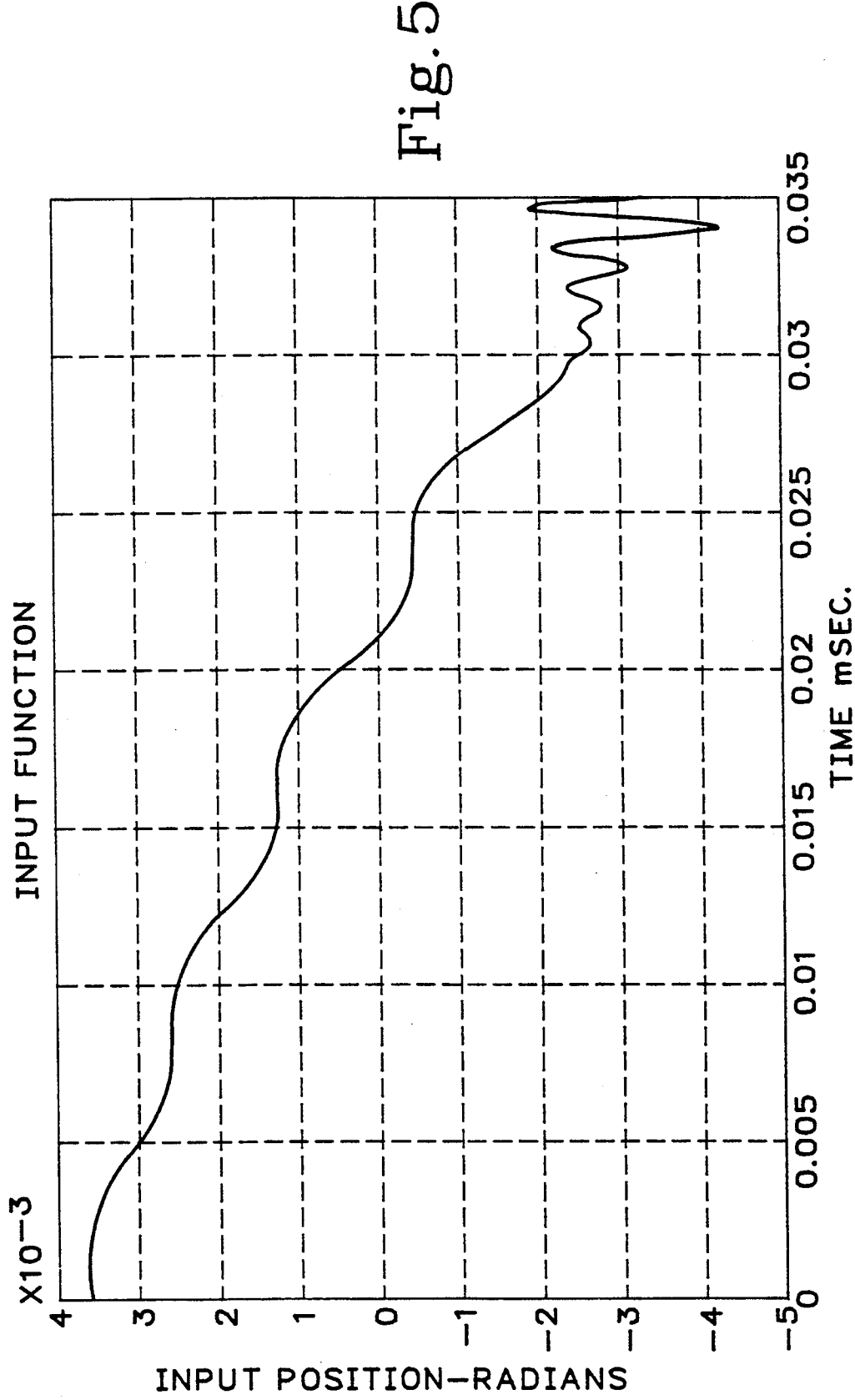
FIG. 5 shows an illustrative input function derived using the Kalman controllability formulation according to methods of the present invention.

These values are first used to derive the continuous input function u(t) capable of driving the system from $x_0$ to $x_1$. The continuous input function derived using these values is shown in FIG. 5. The Kalman controllability formulation for a continuous input u(t) is then implemented using MATLAB software available from The Math Works Inc., 21 Elliot Street, South Natick, MA 01760. The analysis uses the equation:

$$x(t) = e^{(A(t-t_0))}x_0 + \int_0^{t_1} e^{(A(t-q))}B \cdot u(q)dq$$

to determine the position and velocity profiles of the masses corresponding to the input function u(t).

Figure 6A:
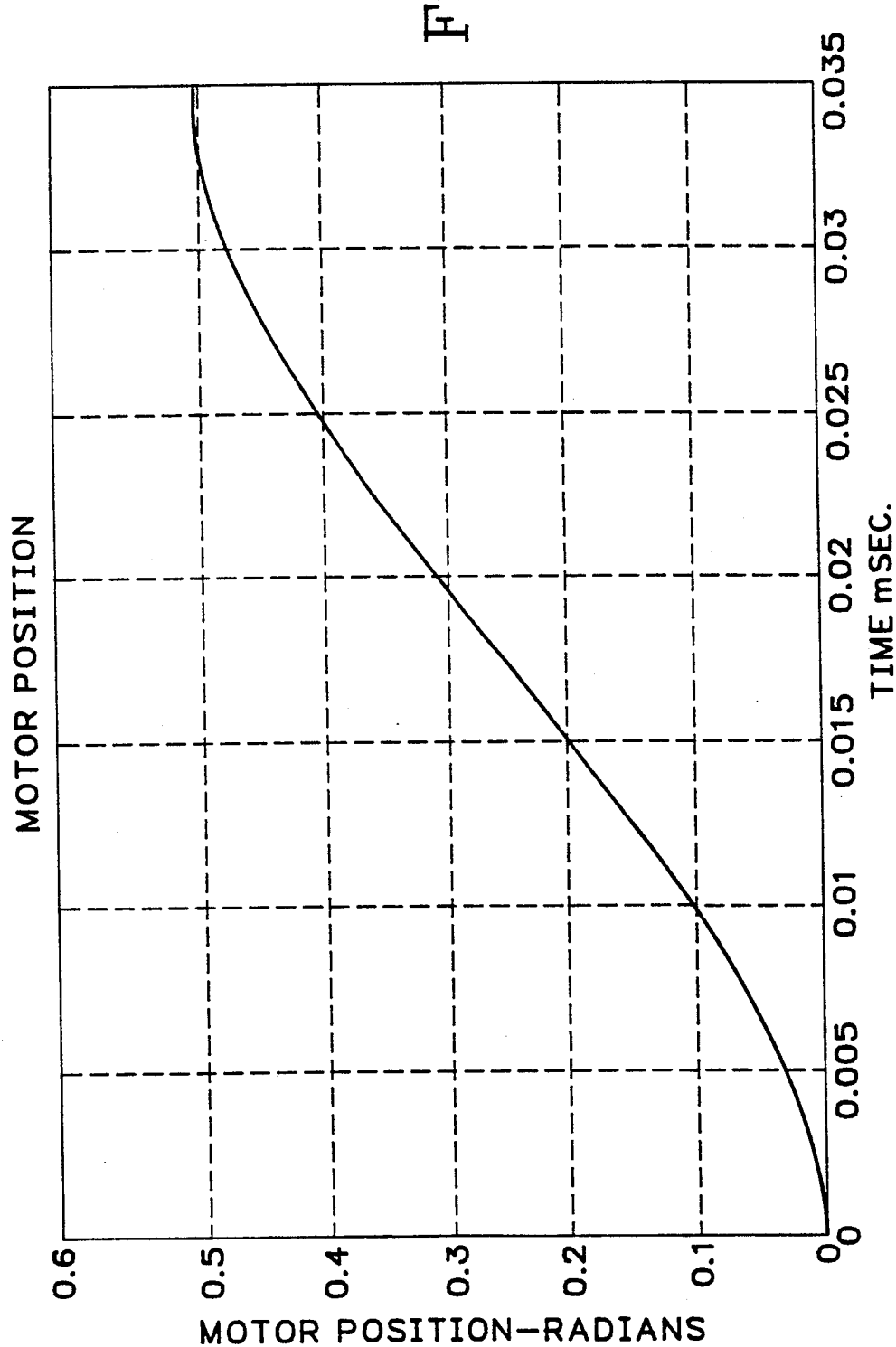
FIG. 6(a) shows an ideal motor position profile corresponding to the input function of FIG. 4.
Figure 6B:
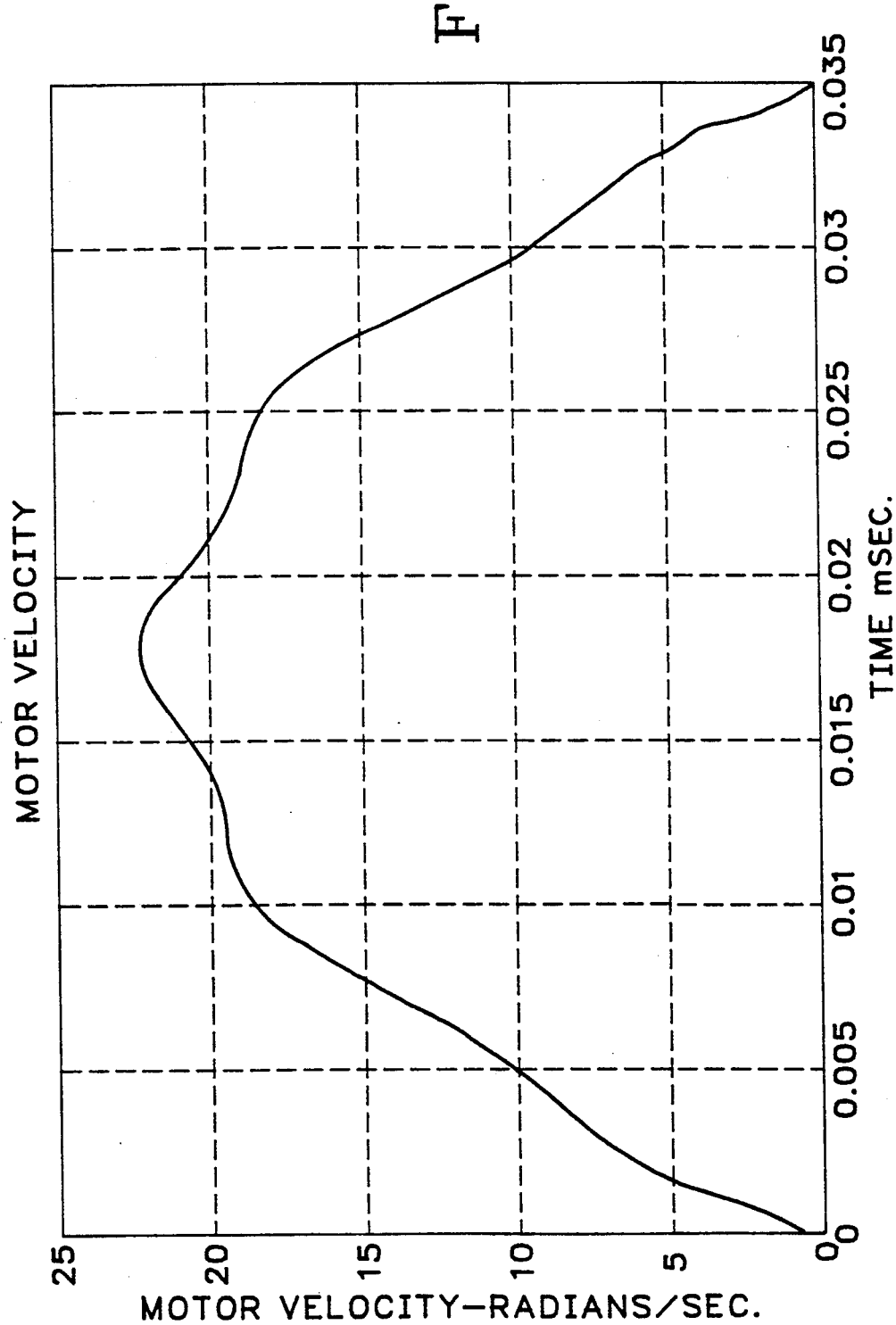
FIG. 6(b) shows an ideal motor velocity profile corresponding to the input function of FIG. 4.
Figure 7A:
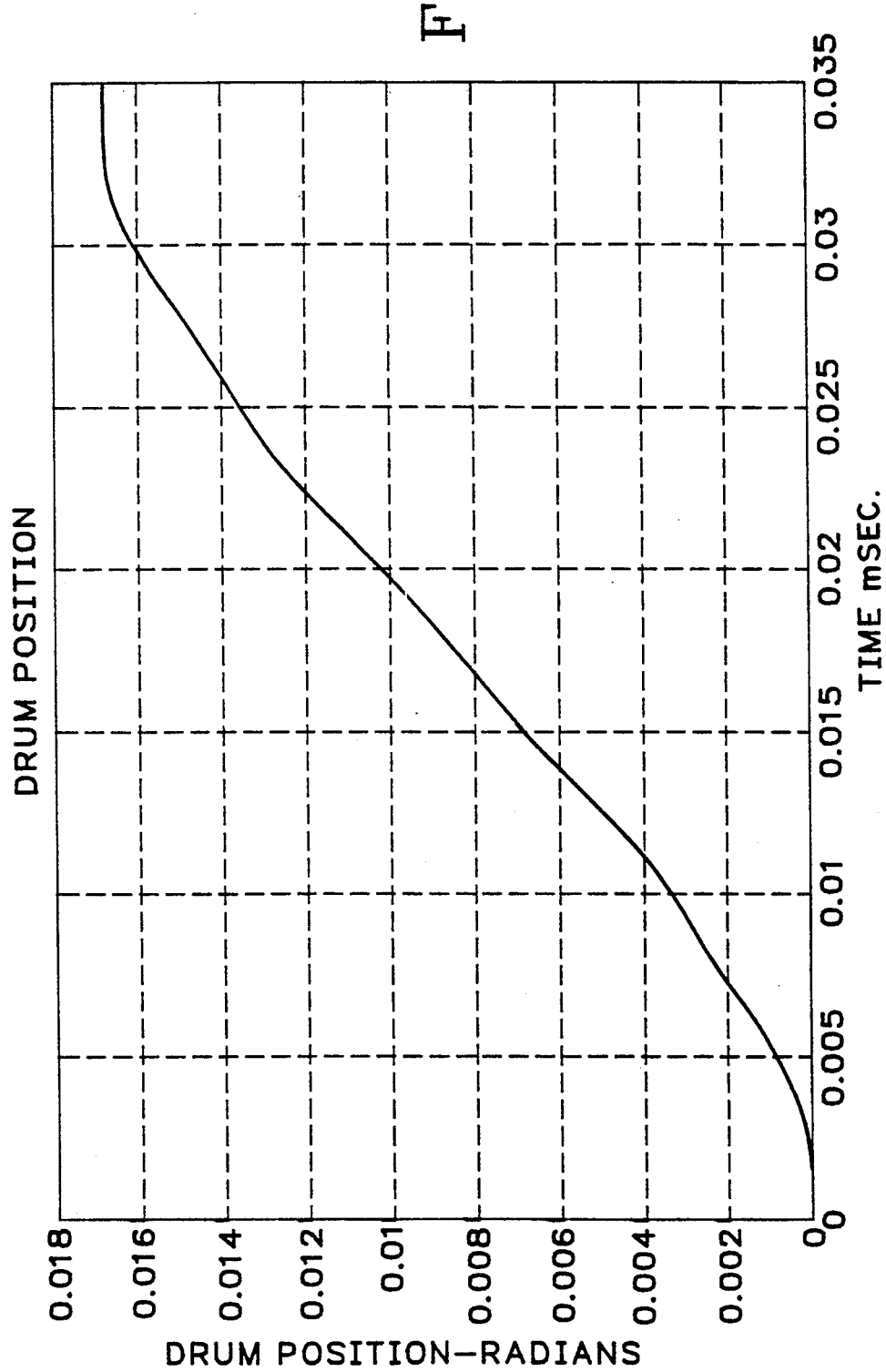
FIG. 7(a) shows an ideal print drum position profile corresponding to the input function of FIG. 4.
Figure 7B:
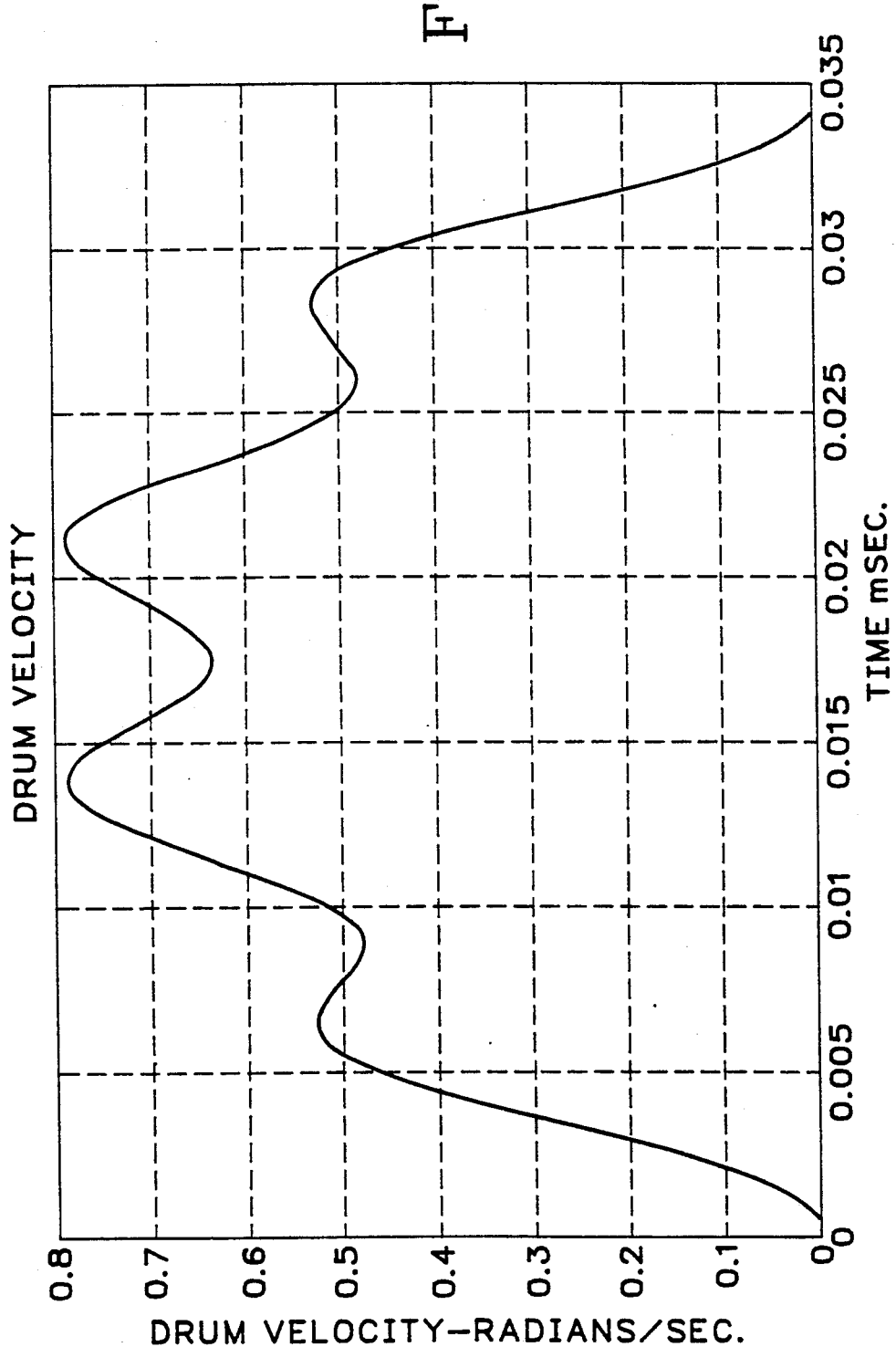
FIG. 7(b) shows an ideal print drum velocity profile corresponding to the input function of FIG. 4.

The ideal motor position and velocity profiles derived using this equation are shown in FIGS. 6(a) and 6(b), respectively. The intermediate idler position and velocity profiles are substantially the same as those for motor position velocity, except that the values are reduced as a result of the gear reduction. The ideal print drum position and velocity profiles are shown in FIGS. 7(a) and 7(b). These plots demonstrate that each mass would reach zero velocity at the end time point, 0.035 sec.

Using the ideal position and velocity profiles generated as described above, the actual delay lengths of microstep input pulses were apportioned to match the ideal profiles. Curve fitting the ideal motor position and velocity profiles shown in FIGS. 6(a) and 6(b) is therefore a major factor in the choice of microstep delay times to serve as input in a numerical integration simulation of three mass system motion. Additionally, the difference between the motor command angle $\phi$ and motor position $\theta$ is preferably monitored and maintained as small as possible, consistent with the ideal position and velocity profiles. Derivation of the actual microstep input pulse delay lengths by curve fitting, for example, may be accomplished in any convenient manner.

A numerical integration simulation of the differential system motion equations was conducted using the Continuous System Modeling Program (CSMP), available from California Scientific Software. The system constants used in the numerical integration were as described above for ideal input and motion profile generation, with the addition of $T_s$, the microstep timing constant having a value of $6.25 \times 10^{-5}$ seconds. Also, since numerical integration simulations are not limited to linear systems, physical constants were developed to describe the influence of coulomb friction on the three mass system and were incorporated in the simulation. The controlling parameter for the friction effects was the sign of the velocity of the mass upon which the frictional torque is acting, $X_3(t)$. The frictional force applied for positive velocities, shown for $T_F$ in FIG. 4, was valued at 2.4 lb-in. The frictional force for negative velocities was valued at $-2.2$ lb-in. The frictional force acting when the mass is at rest was valued at 2.4 lb-in. These four parameters were input into a function switch function of the CSMP system to generate a value for the frictional torque, $T_F$.

Figure 8:
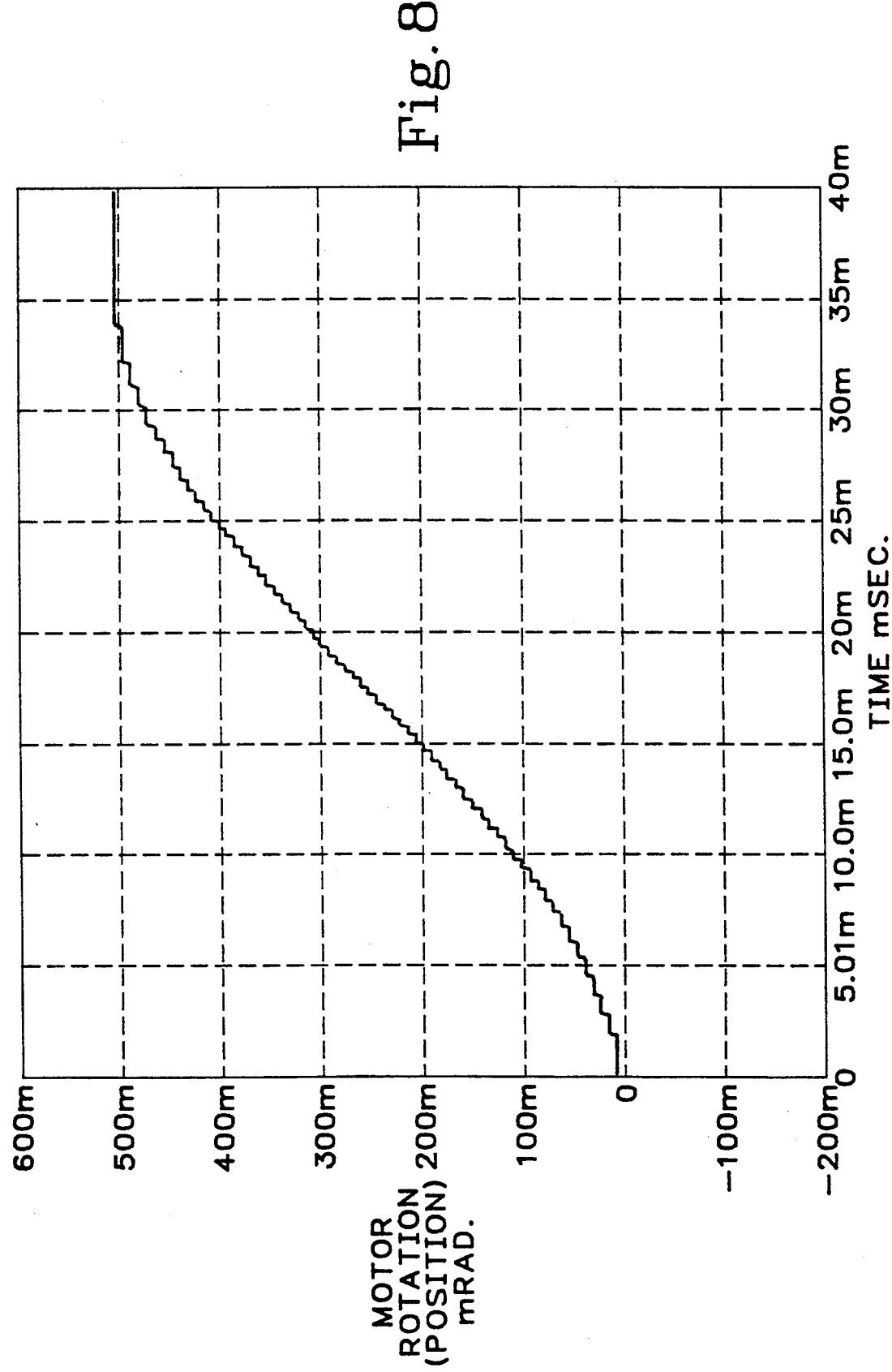
FIG. 8 illustrates a graphical representation of motor drive microsteps used in a numerical integration simulation of the motion of the three mass system shown in FIGS. 2 and 4.
Figure 9A:
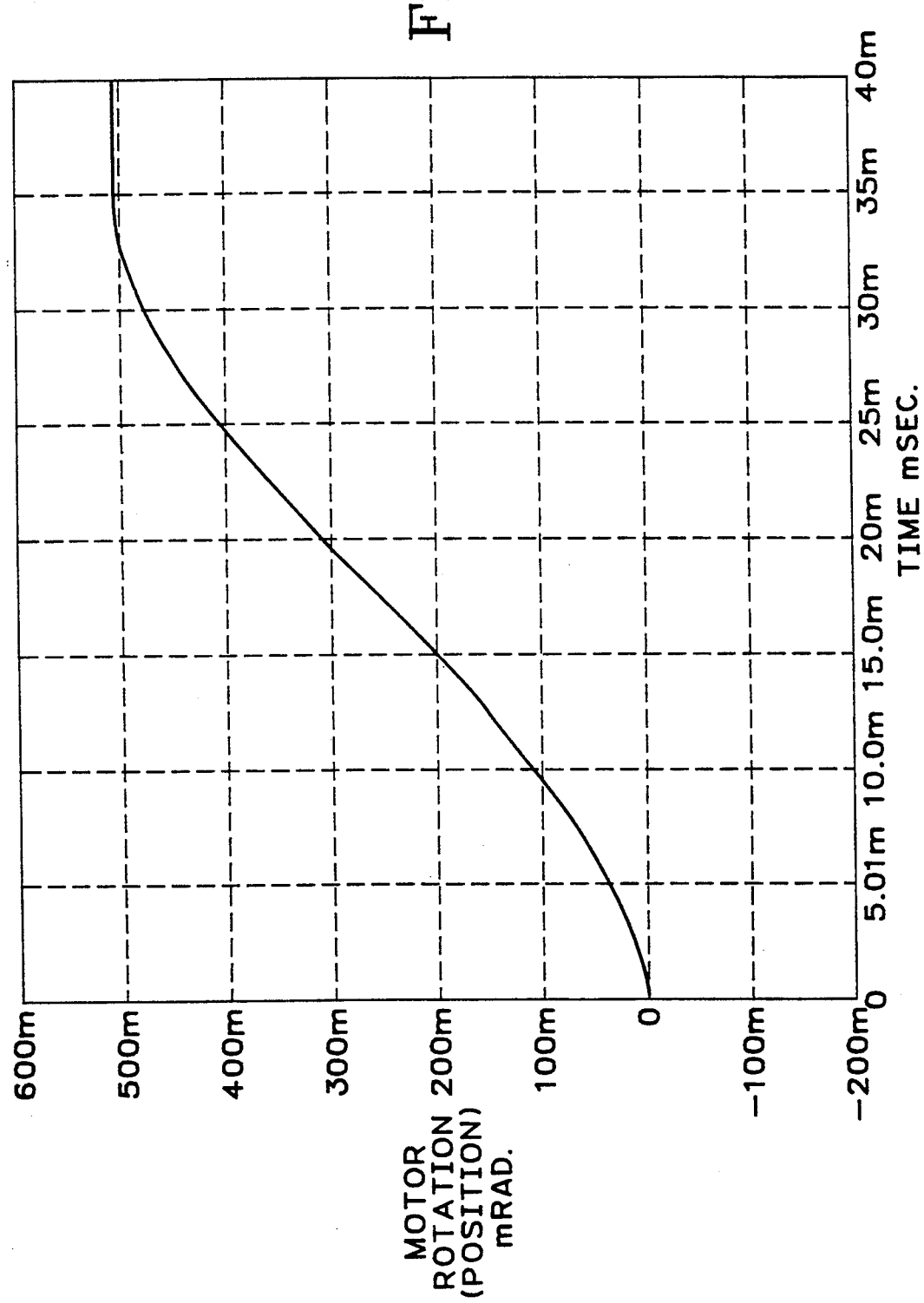
FIG. 9(a) shows the numerical integration simulation for motor position corresponding to the ideal motor position profile of FIG. 6(a)
Figure 9B:
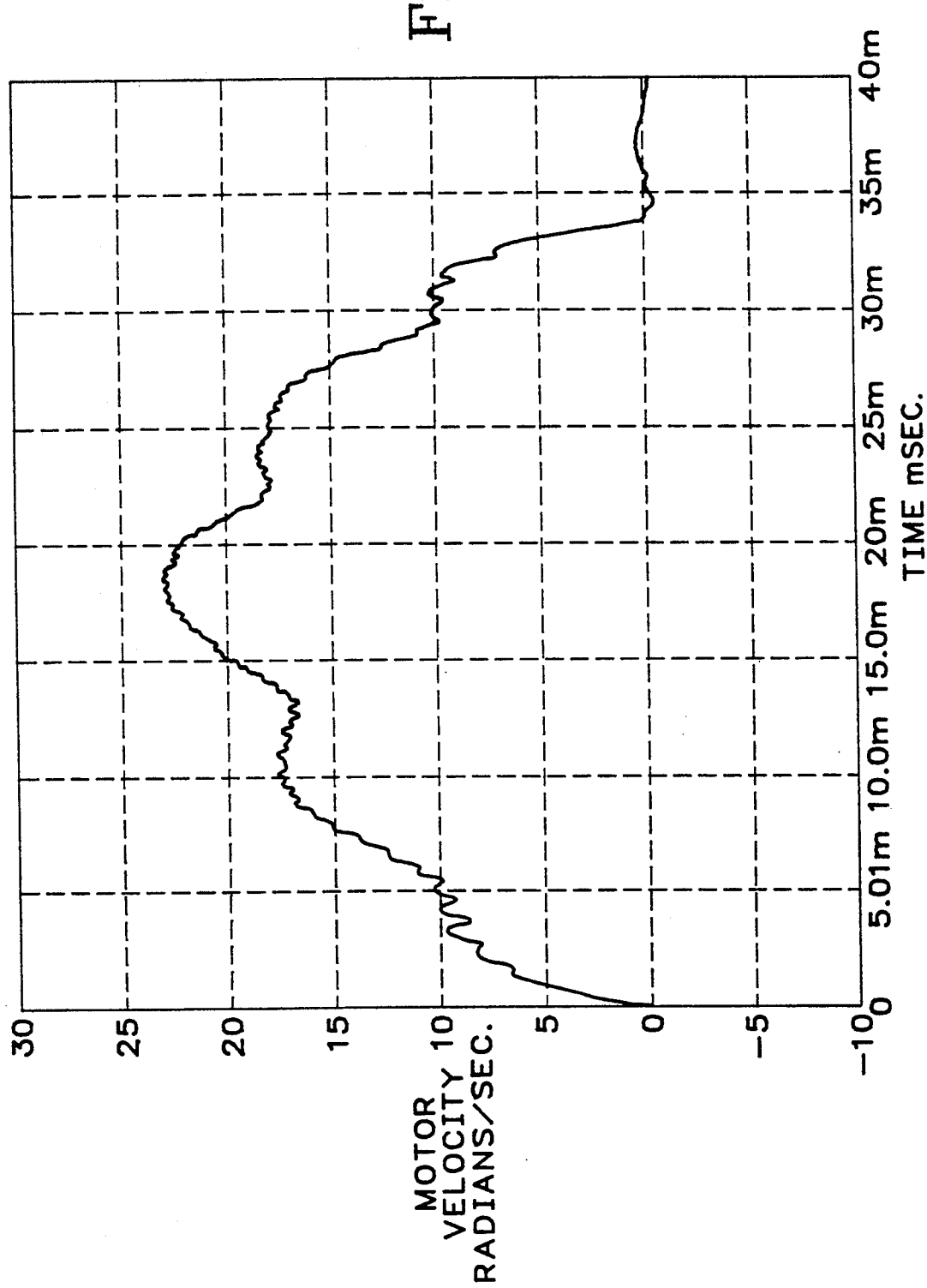
FIG. 9(b) illustrates the numerical integration simulation for motor velocity corresponding to the ideal motor drive velocity profile shown in FIG. 6(b)
Figure 10A:
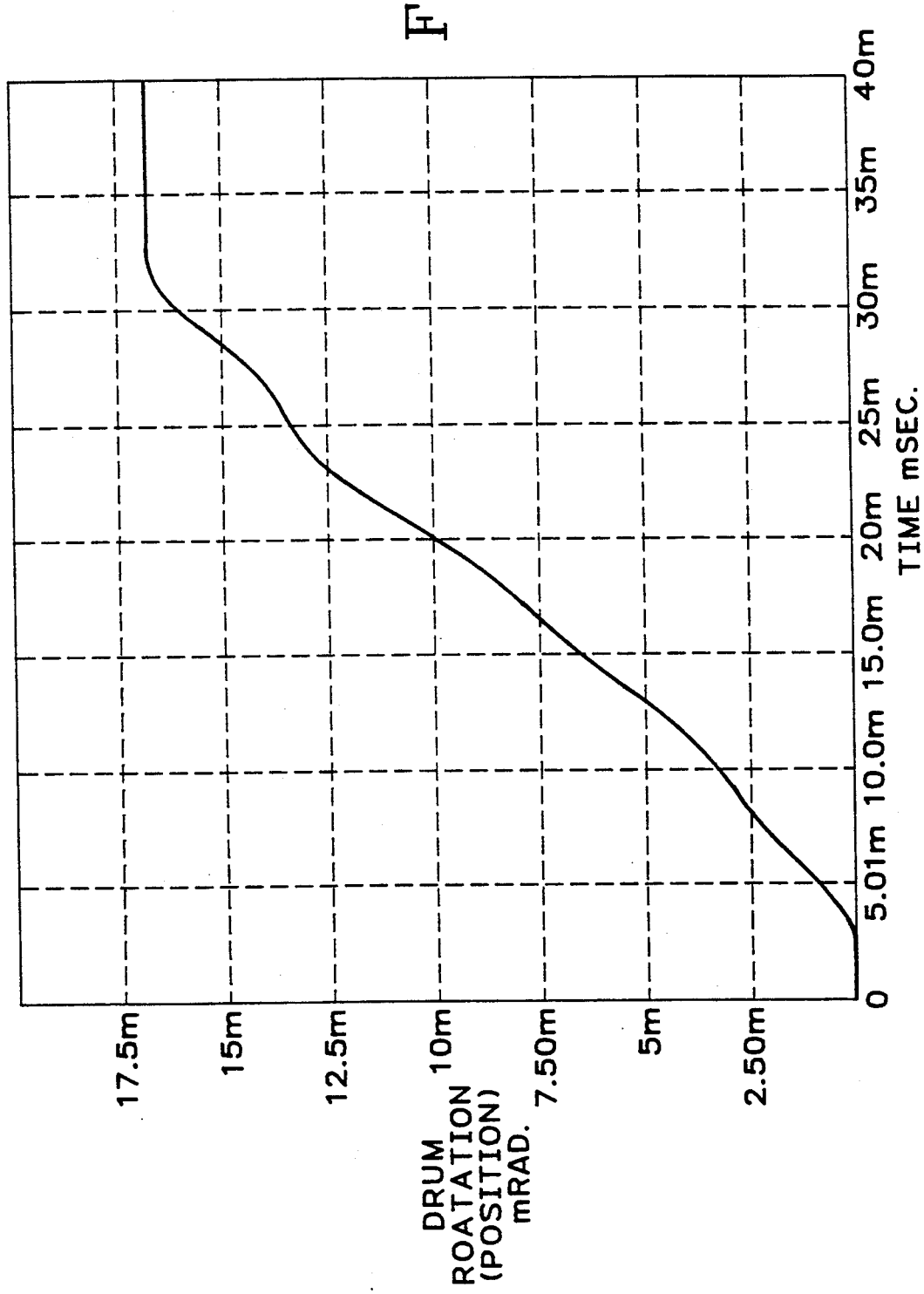
FIG. 10(a) illustrates the numerical integration simulation for print drum position corresponding to the print drum position profile shown in FIG. 7(a)
Figure 10B:
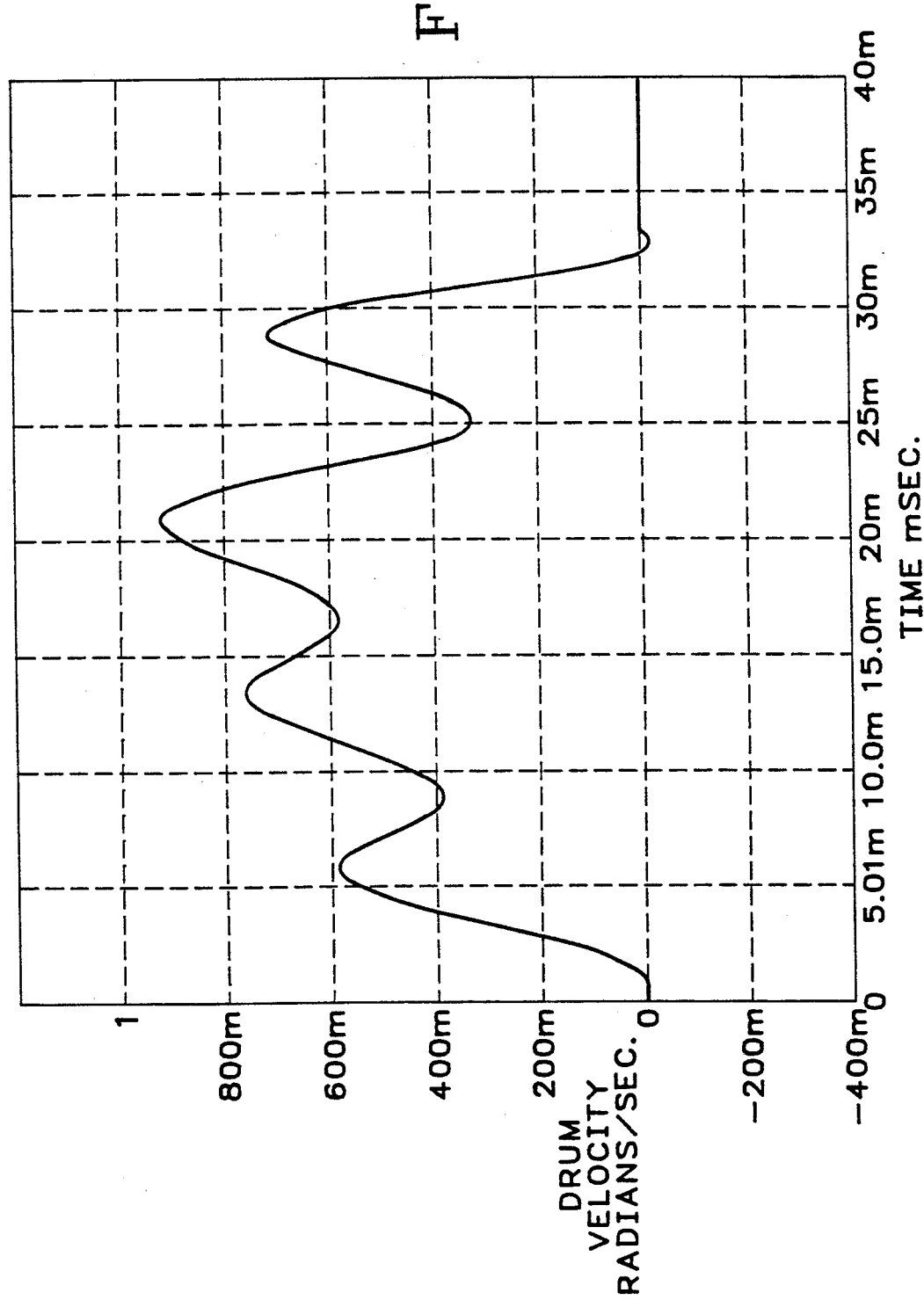
FIG. 10(b) shows the numerical integration simulation for print drum velocity corresponding to the print drum velocity profile shown in FIG. 7(b)

FIG. 8 shows the simulated motor input microsteps; FIGS. 9(a) and 9(b) show the simulated motor position and velocity profiles especially; and FIGS. 10(a) and 10(b) illustrate the simulated drum position and velocity profiles based upon the motor input illustrated in FIG. 8.

Figure 11A:
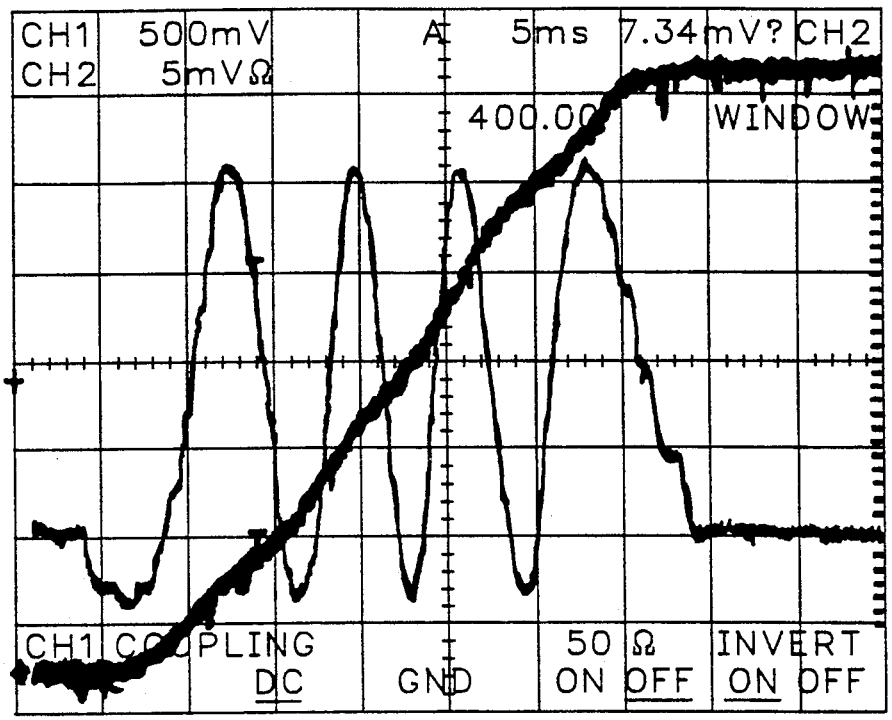
FIGS. 11(a) and 11(b) show oscilloscope photographs illustrating an actual print drum position profile and stepper motor current wave form over time, respectively, generated using a motor input approximating the ideal motion profile derived according to the present invention.
Figure 11B:
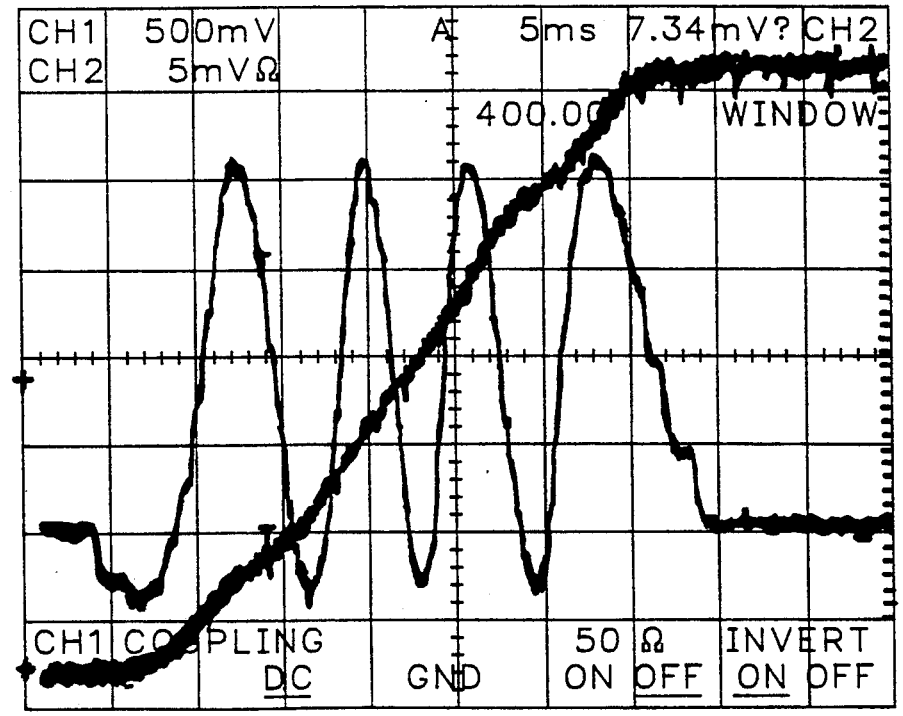

The ideal motor position profile generated using the Kalman controllability formulation illustrated in FIG. 6(a) corresponds closely to the motor profile generated using the numerical integration simulation shown in FIG. 9(a) that is based upon the microstep delay times illustrated in FIG. 8. The microstep delay times approximating the ideal motor profile of FIG. 4a, $x_{theoretical}$ versus t, were implemented as microstep impulse inputs to a three mass system as illustrated in FIG. 2. Oscilloscope photographs of the drum position v. time performance and the current wave form in one motor phase are presented in FIGS. 11(a) and 11(b). The actual drum position profiles shown in the oscilloscope photographs for a three mass system of the type illustrated in FIG. 2 corresponds closely to both the ideal and simulated profiles. The system implementation resulted in smooth drum motion without ringing or overshoot at the inflection points. Moreover, the system produced significantly reduced audible noise.

Although the methods and systems of the present invention have been described with reference to a three mass system for driving a print drum, it will be obvious that the methods may be applied to generate motion profiles for a wide variety of systems requiring precise movement of system components from one state (position) to another.

While in the foregoing specification, this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. A method for generating a motion profile for driving at least one mass in a system between an initial zero velocity location and a desired zero velocity location by a common drive means, the method comprising:
    generating a differential equation of motion for each of said masses in the system;
    expressing the differential equations of motion in a dynamic state variable equation;
    defining an initial and a desired system state and a desired time interval required to advance the system from the initial to the desired state;
    developing a continuous driver input function required to transfer a mass from the initial state to the desired state in the time interval based upon a Kalman controllability formulation; and
    implementing the continous driver input function to solve the dynamic state variable equation for a system state vector that describes a continuous position and velocity profile for each mass in the system.

2. A method according to claim 1 wherein the motion equations are derived for three masses interconnected by two flexible connecting means.

3. A method according to claim 2 wherein the three masses comprise a motor rotor, an idler pulley and a print drum and the connecting means comprise timer belts.

4. A method according to claim 3 wherein the motion equations are derived by approximating the timer belt motion with an elastic coefficient and a viscous damping parameter in combination with a frictionless gear ratio.

5. A method according to claim 3 wherein the motion equations are derived on the basis of an instantaneously changing motor command angle.

6. A method according to claim 3 wherein the motion equations are derived by approximating applied torque as a sine function of the difference between a motor command angle and motor rotor position.

7. A method according to claim 3 wherein the motion profile for each mass is characterized in that each driven mass reaches the desired zero velocity position at substantially the same time.

8. A method according to claim 3 wherein the motion profile for each mass is characterized in that each mass arrives at the desired location with zero velocity and no residual strain energy is stored in the timing belts when each mass has reached the desired zero velocity location.

9. A method for controlling rotational output of a stepper motor rotor in a system wherein the stepper motor rotor is a first mass that drives at least one additional mass between an initial zero velocity location and a desired zero velocity location, comprising:

generating a differential equation of motion for each of said masses in the system;

expressing the differential equations of motion as a dynamic state variable equation;

defining an initial and a desired system state and a time interval required to advance the system from the initial to the desired state;

developing a continuous driver input function required to transfer a mass from the initial state to the desired state in the time interval based upon a Kalman controllability formulation;

implementing the continuous driver input function to solve the dynamic state variable equation for a system state vector that describes a continuous position and velocity profile for the stepper motor rotor; and generating a pattern of stepper motor input pulses and delay times that produces stepper motor rotor output approximating the continuous position profile of the stepper motor rotor described by the system state vector.

10. The method of claim 9 additionally comprising preparing a numerical integration simulation for the system using the differential equation of motion for each mass and incorporating physical constants to describe the influence of coulomb friction on each of the masses to derive simulated motor input microsteps.

11. In a system comprising a print substrate indexed by rotational output of a stepper motor rotor, the improvement comprising controlling the rotational output of the stepper motor rotor such that its velocity profile during each predetermined time interval between a first zero velocity position and a second zero velocity position is non-linear and substantially non-constant.

12. A system according to claim 11, wherein the motor rotor velocity profile is characterized by acceleration from the first zero velocity position to a velocity maximum and deceleration from the velocity maximum to the second zero velocity position.

13. A system according to claim 12, wherein the velocity maximum of the motor rotor velocity profile is at about the mid-point of the predetermined time interval.

14. A system according to claim 12, wherein the motor rotor velocity profile is substantially a mirror image about the velocity maximum.

15. A system according to claim 10, wherein the motor rotor velocity profile is substantially as illustrated in FIG. 6(b).

16. In a printing system comprising a print substrate indexed by rotational output of a stepper motor, the improvement comprising controlling the rotational output of the stepper motor rotor to provide a print substrate velocity profile during each predetermined time interval between a first zero velocity position and a second zero velocity position that is non-linear and substantially non-constant.

17. A system according to claim 16, wherein the print substrate velocity profile is substantially a mirror image about the midpoint of the predetermined time interval and two substantially equivalent velocity maxima are symmetrical but do not coincide with the midpoint of the predetermined time interval.

18. A system according to claim 16, wherein the print substrate velocity profile is substantially as illustrated in FIG. 7(b).

* * * * *